United States Patent [19]
Lawitzky et al.

[11] Patent Number: 5,475,708
[45] Date of Patent: Dec. 12, 1995

[54] CIRCUIT ARRANGEMENT WITH AT LEAST ONE INPUT AND AT LEAST ONE OUTPUT FOR FORWARDING AN INPUT SIGNAL THAT CAN BE FILTERED, PARALLELIZED AND DIGITIZED

[75] Inventors: Gisbert Lawitzky; Wolf-Dietrich Möller, both of München; Franz-Josef Schmitt, Bad Aibling, all of Germany

[73] Assignee: Siemens Aktiengesellschaft, Munich, Germany

[21] Appl. No.: 227,901

[22] Filed: Apr. 15, 1994

Related U.S. Application Data

[63] Continuation of Ser. No. 835,458, Mar. 2, 1992, abandoned.

[30] Foreign Application Priority Data

Sep. 25, 1989 [DE] Germany .................... 39 31 977.6

[51] Int. Cl.⁶ ............................ H04J 3/24; H04J 3/02
[52] U.S. Cl. .................................... 375/219; 370/85.13
[58] Field of Search .................... 370/60, 58.1, 94.1, 370/85.13, 123; 341/159, 162; 375/257, 377, 259, 219, 36, 121

[56] References Cited

U.S. PATENT DOCUMENTS

| | | | |
|---|---|---|---|
| 4,627,052 | 12/1986 | Hoare et al. | 370/94.1 |
| 4,890,280 | 12/1989 | Hirata | 370/60 |
| 4,962,499 | 10/1990 | Sennema | 370/60.1 |

Primary Examiner—Stephen Chin
Assistant Examiner—Hai H. Phan
Attorney, Agent, or Firm—Hill, Steadman & Simpson

[57] ABSTRACT

A circuit arrangement (1000, 2000), preferably for a coupling network component of a network node in a packet-switching data network, is disclosed which has a wide parallelization of the data packet signal by means of shift registers (60), so that it is possible to operate internally with a greatly reduced operating speed. In particular, an arrangement of the components on a single semiconductor wafer (3000, 4000) permits an especially wide bus (20), which can be constructed extremely advantageously with a surface-optimized floor plan (3000, 4000).

18 Claims, 11 Drawing Sheets

CIRCUIT ARRANGEMENT WITH AT LEAST ONE INPUT AND AT LEAST ONE OUTPUT FOR FORWARDING AN INPUT SIGNAL THAT CAN BE FILTERED, PARALLELIZED AND DIGITIZED

This is a continuation of application Ser. No. 835,458, filed Mar. 2, 1992 abandoned.

BACKGROUND OF THE INVENTION

The invention relates to a circuit arrangement with at least one input and at least one output for forwarding an input signal that can be parallelized and digitized.

Circuit arrangements of this type are employed for example for a coupling network component of a network node in a packet-switching data network.

An N-to-N knockout switching node for a high-performance packet-switching system is described in U.S. Pat. No. 4,760,570. This is likewise described by the authors Y. S. Yeh, M. G. Hluchyj and A. S. Acampora in the IEEE Journal on Selected Areas in Communication, Volume SAC-5, No. 5, 1987, on pages 801–808 in an article entitled "The Knockout Switch: A Simple Modular Architecture for High-Performance Packet Switching" as a circuit arrangement which is composed of a plurality of inputs and a plurality of outputs, and which is provided for a filterable forwarding of a serial data packet from one of the inputs to an output that can be determined from the data packet. Data packets are filtered out by means of a filter connected directly downstream of the input. These data packets that can be input serially at the input are forwarded serially in a concentrator. The concentrator is here a matrix-shaped permutation circuit composed of basic elements, from which the data packet is forwarded serially bit by bit. The data packets are forwarded serially from the concentrator into a shifter. A serial routing and serial forwarding for a temporary storage in packet memories, into which the data packets are serially read simultaneously from case to case and serially read out again, is carried out for the serial data packet stream by means of the shifter. A common buffer composed of shifters and a specific number of packet memories is provided for each of the outputs. The serial data packet stream from a comparatively large number of inputs can be concentrated and stored in a buffer assigned to the output via a plurality of concentrators with upstream filters by means of an interconnection provided for each of the outputs. The routing of the data packet stream is carried out decentrally and locally. The relevant output for forwarding the data packet is determined from the data packet in the filters. All the data packets that are not destined for the output assigned to the filter are extracted by means of the filter. Except for the storage in the packet memory, the data packets are otherwise always forwarded serially. This so-called KO switch is free of internal blockages since the path of the serial data packet from the input to the output is not correlated with the path of other serial data packets to other outputs. Depending on the number of packet memories per output, external blockages can be prevented. Data packets that arrive simultaneously at a plurality of inputs and are destined for the same output can be temporarily stored in the packet memories of the buffer.

The authors Thomas A., Coudreuse J.-P. and Servel M. describe in an article entitled "Asynchronous Time-Division Techniques: An Experimental Packet Network Integrating Videocommunication" at the Symposium ISS '84 Florence, Italy, 7th to 11th May 1984, Session 32 C Paper 2, a switching node which is called "Prélude". Given an external bit rate of 280 megabits per second on the input and output lines and with 35 megabits per second internally, low loss rates and delays can be achieved even with a high load. Control and storage are carried out centrally. The 16-byte long packets arriving on the 16 input lines of the node are synchronized and are read into the central packet buffer byte by byte offset by one byte in each case. This technique is also termed "paragonal", which is derived from parallel-diagonal. The central control unit performs the translation of the virtual connection addresses and initiates the entry, at which the respective packet is located in the central packet buffer. The entry is made in a queue assigned to the corresponding output, this queue being processed in the order of entry. The paragonal structure of the preprocessing of the data packets relieves the load on the central control unit.

European Patent Application EU-0263418-A2 discloses a switching network for switching digital input signals which arrive on input lines to digital output signals which are output on output lines, so that the input signals are synchronized and combined block by block in time slots, and also that a multiplex signal is obtained which is combined into multiplex blocks block by block from the input signals synchronized in time slots, and also that the multiplex blocks of the multiplex signal can be exchanged with one another for forming a switched-through multiplex signal, and also that the multiplex blocks of the switched-through multiplex signal are converted and are output block by block as output signals. A switching control signal, a so-called connection control signal, is required, by means of which it is defined which of the input lines is to be switched through to which of the output lines in time slots, so that the exchange of the multiplex blocks is controlled by this switching control signal.

SUMMARY OF THE INVENTION

The object of the invention is to disclose a further circuit arrangement for forwarding a signal that can be parallelized and digitized, preferably a serial data packet with a particularly high bit rate, from an input to an output that can be determined from the signal.

This object is achieved in a circuit arrangement with at least one input and at least one output for forwarding an input signal that can be filtered, parallelized and digitized, having the following features:

a) the input signal (8) that can be input at an input (80) of the circuit arrangement (1000, 2000) can be fed to an input signal form converter (60) for input conversion into an at least partially parallelized bit group packet signal (1) composed of at least one parallel bit group, b) connected upstream of an output (90) of the circuit arrangement (1000, 2000) is an output signal form converter (30) for output conversion of the bit group packet signal (3) into an output signal (9) that can be output at the output (90), c) a forwarding means (20) is provided for the parallel forwarding of the bit groups from the input signal form converter (60) to the output signal form converter (30), d) an intermediate memory (40) is provided for temporarily storing at least one of the bit groups of the bit group packet signal, e) an output filter (50) is provided for filterable forwarding of the bit group packet signal, which filter has to determine the relevant output for the forwarding from the bit group packet signal.

The invention is based on the perception that it is possible to reduce the internal operating speed by means of a parallelization provided directly at the input, a temporary storage and a conversion provided directly at the output, and in particular it is possible to forward under decentralized control a particularly high external serial bit rate converted internally to parallel.

The input signal may be provided here in an optical or electronic input signal form that can be digitized and parallelized.

In the input signal form converter, the signal can be converted into a bit group packet signal which is composed of one or more bit groups.

In the output signal form converter, the output signal can be formed from the bit group(s) of the bit group packet signal.

A circuit arrangement with only one input and only one output can be used for example for a delaying, code conversion, conversion of the signal or extraction, it being possible to determine from the signal whether the signal is forwarded to the output or extracted.

The parallel forwarding of the bit group packet signal internally is preferably carried out in bit groups.

At least one bit group of the bit group packet signal can be temporarily stored in an intermediate memory.

The relevant output for the forwarding can be determined from the bit group or the bit groups of the bit group packet signal. The forwarding of a bit group packet signal can be blocked or released.

In the case of a particularly wide parallelization of the input signal in the input signal form converter, the internal operating speed can be reduced very considerably. As a result of a decentralized temporary storage, advantages are conferred with regard to the operating speed of the forwarding means. While the central control may often be overloaded in the case of a centrally controlled network node, this is advantageously avoided in the decentralized concept according to the invention.

Depending on the application, the bit groups of the bit group packet signals are temporarily stored for example according to a pure input memory principle, or for example according to a pure output memory principle, or for example according to a combination of both principles, or for example according to none of these principles. Moreover, in certain applications it is sensible if the temporary storage is provided, for example, in a bit group register which has additional functions, and is employed, for example, as shift register in the input signal form converter or in the output signal form converter for example. For special applications it is expedient for the forwarding means to forward bit groups step-by-step from bit group register to bit group register. For known bit-serial arrangements, of a banyan structure for example, or of a hyperconcentrator for example, or of merge boxes for example, or other known bit-serial structures, the operating speed can be reduced decisively as a result of the parallelization according to the invention, so that instead of one intermediate memory for one bit in each case in the known arrangements, according to the invention a bit group register is provided for a parallel temporary storage of a wide bit group. In this case, as a result of the parallelization, the internal operating speed can be reduced, in particular for a parallel forwarding or temporary storage of the bit groups. Of the wide variety of advantageous applications of the invention, particularly preferred embodiments are described in the text that follows.

One preferred embodiment of the invention is characterized in that an input signal form of the input signal and an output signal form of the output signal are identical and are a clock-controlled serial, digital and electronic data packet. As a result, a plurality of circuit arrangements can advantageously be interconnected in a simple manner, for example in a network node of a packet-switching data network. The data packet is composed, for example, of organizational part and data part. The organizational pan frequently contains the address signal, by means of which it is possible to determine the relevant output of the circuit arrangement for the forwarding.

A further preferred embodiment of the invention is characterized by an output shift register of the output signal form converter, into which the bit group packet signal can be input in bit groups in parallel, and from which the output signal can be serially output. The bit group packet signal may be composed here of one or more bit groups. The width of the output shift register may be equal to the number of bits in the bit group. In each case one bit group of the bit group packet signal can be input in parallel into the output shift register with each output clock pulse, which may be equal, for example, to the bit group clock pulse divided by the number of inputs. In accordance with the bit clock pulse of the data packet, the data packet can be output serially from the output shift register. The output signal form conversion can be advantageously accomplished by a simple output shift register.

A further preferred embodiment of the invention is characterized by an input shift register of the input signal form converter, into which the input signal can be input serially, and from which the bit group packet signal can be output in bit groups in parallel. The input signal form conversion can be accomplished in a simple manner by a simple input shift register.

A further preferred embodiment of the invention is characterized in that the forwarding means has a bit group bus. In an advantageous manner, the bit group packet signal can be forwarded by means of the bit group bus from one unit of the circuit arrangement simultaneously to one or more units of the circuit arrangement. A width of the bit group bus can preferably be provided in the width of the bit group.

A further preferred embodiment of the invention is characterized by a bit group memory of the forwarding means for storing the bit groups in bit group memory registers. To avoid external blockages, data packet signals can be stored in groups, for example, in the bit group memory registers of the bit group memory, so that data packets arriving simultaneously at a plurality of inputs of the circuit arrangement can be stored by means of the bit group memory and can be forwarded in successive data packets and output to an output. The width of the bit group memory register is frequently also referred to as the word width of a memory word of the bit group memory. The bit group memory may be provided here according to a first-in-first-out principle. Bit group memories of this type can be realized in a known simple manner. For example, a FIFO memory with address registers can be employed likewise for the input and the output of bit groups. A FIFO memory with shift registers can also be used. Further embodiments of the bit group memory according to another principle may also be used. For example, a buffering can be provided by means of direct addressing or addressing by means of address registers, in connection with a serializing of the stored bit group packet signals. The urgent forwarding of a bit group packet signal with priority can be marked here in the bit group packet signal or be derived from the input at which the data packet was input. For example, a data packet input at the first of the inputs is forwarded urgently with priority in comparison with the data packets input at the other inputs.

A further preferred embodiment of the invention is characterized in that a number of packets of the bit group packet signals equal to the number of inputs can be stored in the bit group memory. Depending on the number of packets that can be stored in the bit group memory, an average packet loss probability emerges from the traffic profile of the incoming data packets and the switching load. The greater the number of packets for the bit group packet signals that can be stored in the bit group memory, the lower the average packet loss probability is given a comparatively equal number of incoming data packets. Given an average switching load and approximately evenly spread traffic profile, the average packet loss probability is sufficiently low with this preferred embodiment of the circuit arrangement.

A further preferred embodiment of the invention is characterized by at least one index register of the bit group memory for addressing the bit group memory registers. In particular in the case of a cyclical use of the bit group memory registers, the index register may be incremented here and employed as counter register.

A further preferred embodiment of the invention is characterized in that the bit group memory is an output memory assigned to the respective output for storing bit groups of bit group packet signals to be forwarded to the assigned output. The bit group memory may be here the memory element of an output queue. In comparison with input queues, output queues have in a known manner the advantage that internal blockages are avoided and a higher switching load can be achieved.

A further preferred embodiment of the invention is characterized in that a number of bits in the bit group is provided which is at least equal to the number of inputs multiplied by a bit clock pulse of the data packet divided by a bit group clock pulse conditioned by a clock pulse unit which is equal to an output memory clock pulse and likewise to a bit group bus clock pulse. The width of parallelization may be defined by the number of bits in the bit group, depending on the output memory clock pulse and on the number of inputs. The bit group bus clock pulse may be equal to the output memory clock pulse. As a result, bit groups from all inputs can be stored in the output memory. The bit groups can be forwarded by means of the bit group bus from the input signal form converter to an output memory or simultaneously to all output memories. In this case, a temporary storage of one or more of the bit groups can be provided in a bit group register or in an input memory, which may be provided directly in the input signal form converter or be connected directly downstream thereof. The bit groups can be fetched in sequence in cyclical order from all inputs from the bit group registers or the input memories by means of the bit group bus and forwarded to the output memory or simultaneously to all output memories connected to the bit group bus. In a preferred embodiment, the output filter can be connected directly upstream of the output memory or be provided directly in the memory input pan of the output memory. An advantageously low main memory clock pulse can be achieved with a particularly wide parallelization with a large number of bits in the bit group.

A further preferred embodiment of the invention is characterized in that the input signal can be converted in the input signal form converter into a plurality of successive bit groups of the bit group packet signal, it being possible to determine the relevant output for the forwarding from the first bit group. The output filter can ascertain from the first bit group the relevant output for the forwarding of all bit groups of the bit group packet signal of a converted data packet. In one of the preferred embodiments mentioned, the output filter may be incorporated in the input signal form converter. In this case, it is possible to ascertain from the first bit group of the bit group packet signal of a converted data packet whether this first and the further following bit groups of the bit group packet signal are to be released or to be blocked for the forwarding. If forwarding is to be blocked, the forwarding of the first converted bit group is blocked or disabled, likewise for all following bit groups until the arrival of the next bit group packet signal of a converted data packet. In another embodiment mentioned, the output filter can be connected directly upstream of the output memory or be integrated therein. In this case, for example, by means of the bit group bus clock pulse it is possible to ascertain from which input signal form converter the bit group received originates, so that the latter can be assigned to a bit group packet signal. The division of the bit group packet signal into a plurality of successive bit groups can advantageously permit a smaller number of bits in the bit group, which makes a smaller bit group bus width possible, which may be advantageous in particular if the output memory clock pulse is only low or is smaller by a few magnitudes in comparison with the bit clock pulse of the data packet.

A further preferred embodiment of the invention is characterized by a serializing means of the output memory, by means of which the bit groups input into the output memory can be output in series in successive bit group packet signals. By means of the bit group bus clock pulse it is possible to ascertain, for example, from which input signal form converter the bit group received via the bit group bus originates. The bit group can thus be assigned to the bit group packet signal, so that from this the serializing means of the output memory initiates or controls the storage of the bit group in the respective bit group memory register provided and reserved for storing the bit group. The addressing of the respective bit group memory register can be carried out here, for example, with the assistance of the index register, or one of the index registers, of the bit group memory. In accordance with the output clock pulse, the memory output of the bit group can be carried out by the serializing means of the output memory with the assistance of the index register, or one of the index registers, for addressing the bit group memory register. All bit groups of a bit group packet signal are output here successively in accordance with their order. Following this, the stored bit groups of the next bit group packet signal are output. With the serializing means it is possible to initiate that, of a plurality of stored bit group packet signals, the one which was stored first is output first. The combination of the bit groups to form bit group packet signals and the order of the bit group packet signals can advantageously be initiated or controlled by the serializing means. An additional queue organization is consequently necessary, because as a result of the serializing means of the output memory the storage of the bit groups in the output memory can be carried out cyclically in accordance with the addressing of the bit group memory registers, ordered according to bit group packet signals, and within the bit group packet signals ordered according to the order of the bit groups of the bit group packet signals. This embodiment can be advantageously applied in particular for the forwarding of particularly long data packets or digitizable signals of a particularly large number of bits.

A further preferred embodiment of the invention is characterized by a bit group packet signal composed of a single bit group. In this case, an entire bit group packet signal can be forwarded in the circuit arrangement with each bit group.

Given employment of the output memory, the additional serializing of the bit groups for the combination of bit group packet signals in the output memory can be dispensed with here. This embodiment can be advantageously applied in particular given a comparatively low number of bits in the bit group packet signal. Moreover, in the case of an especially wide bit group bus, the bit group memory clock pulse is particularly low in an advantageous manner in comparison with the bit clock pulse of the data packet. Of a plurality of input and stored bit groups, in each case the bit group input first can be output first by an output means of the output memory. In accordance with the addressing of the bit group memory registers, these can be written cyclically for example. The addressing of the bit group memory registers can be carried out here for example with the assistance of the index register or index registers of the bit group memory. The output means can thus be realized in a simple manner.

A further preferred embodiment of the invention is characterized by an input stage assigned to the input which is composed of an input memory as intermediate memory and of the input shift register. The width of the input shift register may be equal to the number of bits in the bit group. In each case one bit group can be output in parallel here to the input memory from the serial data packet with each input clock pulse. The input memory may be provided here according to a first-in-first-out principle, and be able to store, for example, the bit groups of at most two bit group packet signals in its bit group registers. Given employment of the bit group bus, the latter can sequentially fetch in each case all bit groups of an entire bit group packet signal from one of the input memories, and can afterwards sequentially fetch in each case all the bit groups of a further bit group packet signal from a further one of the input memories. In this manner, as a result of the temporary storage and as a result of the collecting of the bit groups in the input memories, entire bit group packet signals can be put together in these. If such input memories are employed, given employment of output memories for these, the serializing of the bit groups to form bit group packet signals can be dispensed with. The input memory can also be designed as a tandem buffer for input and output of a bit group packet signal in each case. By virtue of the input stage, a component of the circuit arrangement, which can be advantageously employed in particular for extensions, can be formed in a simple manner.

A further preferred embodiment of the invention is characterized by an output stage composed of the output shift register, the output memory and the output filter. Bit group packet signals can be forwarded to the output stage of the circuit arrangement, it being possible to filter out via the output filter those bit group packet signals whose forwarding is to be blocked off in the output stage of the circuit arrangement. By virtue of the output stage, a component of the circuit arrangement, which can be advantageously employed in particular for extensions, can be formed in a simple manner.

In each case one input stage can be provided for each input and in each case one output stage can be provided for each output. Each data packet arriving at the input can be converted in the input shift register, assigned to the respective input, of the input stage to form the bit groups of the bit group packet signal temporarily stored in the input memory. The bit groups temporarily stored in the bit group registers of the input memory can be forwarded by means of the bit group bus of the circuit arrangement and reach the output memories of the output stage via the output filters. An output filter can be connected directly upstream of each output memory or can be integrated therein. The forwarding can be blocked off directly before the output memory or in the output memory. In any case, only those bit groups whose forwarding to the output assigned to the output memory is intended are stored in the output memory. In accordance with the output clock pulse, the bit groups can be forwarded from the output memory to the output signal form converter. The bit groups can be fetched by the bit group bus in accordance with the bit group bus clock pulse from the input memory of an input stage and can be simultaneously forwarded to each output memory via the output filters. In this case, all bit groups of a bit group packet signal can be forwarded directly successively from the input memory by the bit group bus to the output memories.

A further preferred embodiment of the invention is characterized by an output module assigned to the output which is connected on the one hand to the assigned output and on the other hand to each input, and which has the output memory, the bit group bus, the output signal form converter and in each case one input part for each input. An internal blocking of the circuit arrangement can consequently be prevented. Moreover, by virtue of the output module, a component of the circuit arrangement, which can be advantageously employed in particular for extensions, can be formed in a simple manner.

A further preferred embodiment of the invention is characterized in that the input pan has the input shift register, the output filter and an input memory as intermediate memory. The output filter may be connected here directly upstream of the input shift register, integrated therein or be connected directly downstream thereof. In each case, only those bit groups whose forwarding to the output assigned to the output module has been checked and released by the output filter are temporarily stored in the input memories. The bit groups can be forwarded from the input memory to the output memory of the output module by means of the bit group bus of the output module. The bit groups of in each case one bit group packet signal are forwarded to the output memory by the bit group bus in accordance with the bit group bus clock pulse from the input memories, assigned to each input, of one of the input parts. In each case one bit group can be forwarded from the output memory to the output signal form converter in accordance with the output clock pulse. In this type of circuit arrangement with separate output modules and an output filter directly in the input part, only those bit groups whose forwarding to the output assigned to the output module is intended are forwarded from the bit group bus of the respective output module.

A further preferred embodiment of the invention is characterized by an integrated construction on a single semiconductor wafer. As a consequence, in particular an especially wide bit group bus can be realized. Given an especially wide bit group bus, the bit group memory clock pulse can be particularly low in comparison with the bit clock pulse of the data packet. The basic material of the semiconductor wafer may be gallium arsenide for example, or one of the other known semiconductor materials. Particularly in the case of gallium arsenide, the known advantages of gallium arsenide semiconductor technology with respect to the fast switching times can be conferred thereby.

A further preferred embodiment of the invention is characterized by a basic material of the semiconductor wafer made of silicon. The known advantages of cost-effective silicon semiconductor technology with respect to the fast switching signals and with respect to the heat conductance can be conferred thereby.

A further preferred embodiment of the invention is characterized in that CMOS circuit parts are provided on the semiconductor wafer. As a consequence, the known advantages in particular with respect to a low heat dissipation and in particular with respect to a favorable stable behavior can be conferred. It is also possible to provide further electronic circuit parts in addition to the CMOS circuit parts.

A further preferred embodiment of the invention is characterized in that BICMOS circuit parts are provided on the semiconductor wafer. As a consequence, the known advantages of a combination of bipolar technology with CMOS technology can be conferred. In particular, the known advantages of bipolar technology with respect to speed can be utilized thereby. For example, the input signal form converter and also the output signal form converter can be constructed in bipolar technology. For example, circuit elements for temporary storage, or in particular for storing the bit groups can be constructed in CMOS technology.

A further preferred embodiment of the circuit arrangement according to the invention is characterized in that its circuit parts are arranged next to one another on the semiconductor wafer in rectangular areas with an identical register area width determined by the number of bits. Owing to the employment of rectangular register-area-wide areas for arranging circuit parts of the circuit arrangement, an optimum utilization of the surface of the semiconductor wafer can be achieved. The registers of the circuit elements, in particular the input shift register, the output shift register, the bit group register and the memory inputs as well as the memory outputs of the input memory and of the output memory, may be arranged here along the register area width of the rectangular areas bit by bit in a row.

A further preferred embodiment of the invention is characterized in that areas to be connected to the same bit group bus are arranged register area width to register area width next to one another in each case. In particular as a consequence of the fact that all the areas associated with one bit group bus can be arranged register area width to register area width next to one another, the line connections of the bit group bus can be laid in an at least approximately straight line in an advantageously simple manner. By virtue of these optimum short line connections, particular advantages for the transit time during the forwarding of the bit groups can be conferred.

A further preferred embodiment of the invention is characterized by the following arrangement on the semiconductor wafer:

a) the output module is arranged in a register-area-wide rectangular module area, b) the module areas identically constructed for each output in each case are arranged next to one another, c) input shift registers, output filters and input memories assigned in each case to each input are arranged in the output module in a register-area-wide rectangular input area in each case, d) the output memory and the output shift register are arranged in the output module in a register-area-wide rectangular output area.

This preferred embodiment can be realized in this manner with an optimum utilization of the surface of the semiconductor wafer.

A further preferred embodiment of the invention is characterized by the following arrangement on the semiconductor wafer:

a) the input stages provided for each input are arranged next to one another in register-area-wide rectangular input stage areas, b) the output stages are arranged next to one another in register-area-wide rectangular output stage areas, c) the input stage areas and the output stage areas are arranged next to one another, d) within each input stage area, the input shift register and the input memory are arranged next to one another, e) within each output stage area, the output filter, the output memory and the output shift register are arranged next to one another.

This preferred embodiment of the invention can be realized in this manner with an optimum utilization of the surface of the semiconductor wafer.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawing, and in which:

DESCRIPTION OF THE PREFERRED EMBODIMENT

Figure 1:
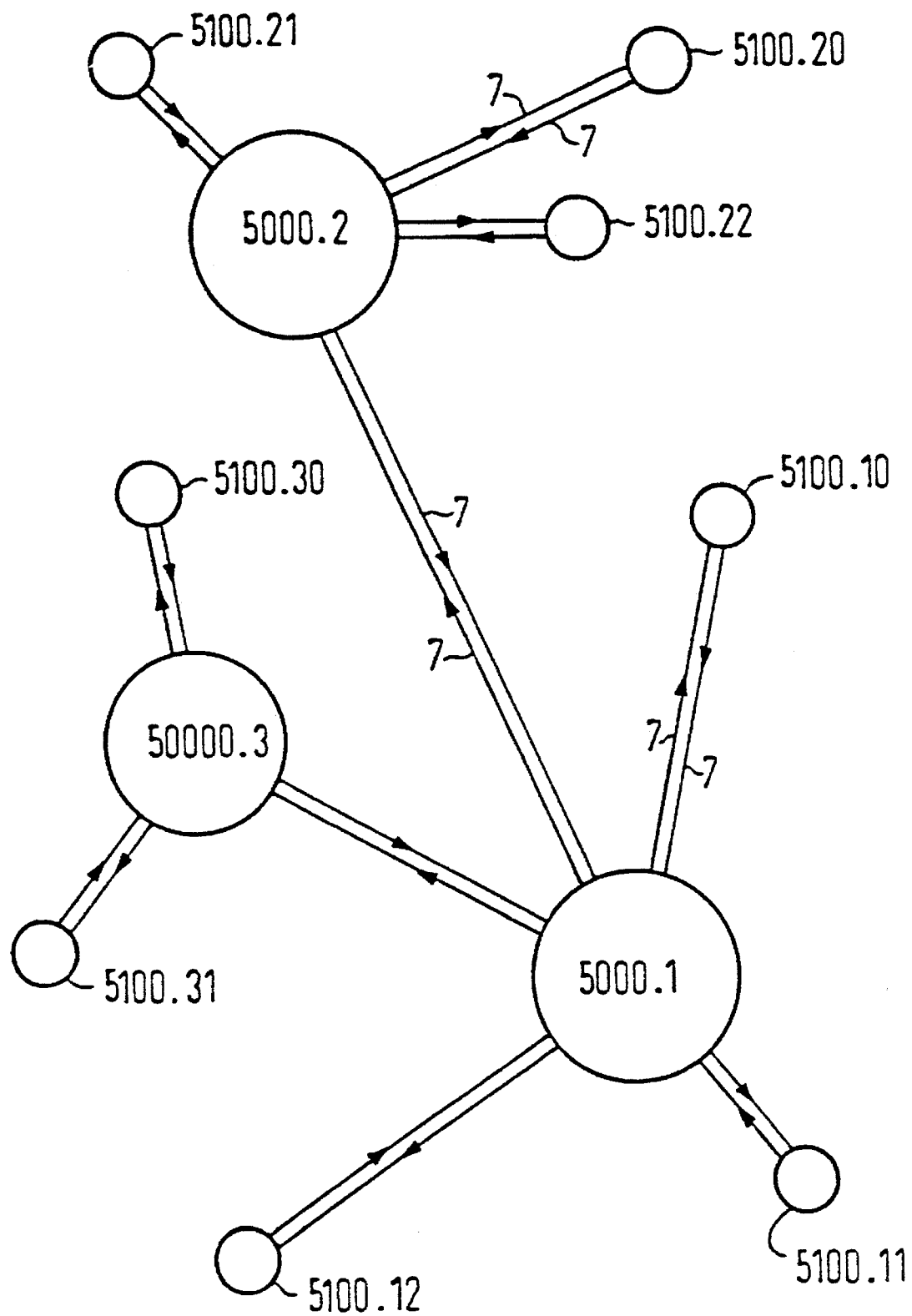
FIG. 1 shows a network structure of a data network for switching data packets.

As FIG. 1 shows for the following exemplary embodiments, a network structure of a clock-synchronized data network for switching data packets is composed, for example, of three network nodes 5000 and a number of subscriber terminals 5100. Data packets are generated as data signals 7 by the subscriber terminals 5100 and are sent to the network nodes 5000 for switching. Each data packet contains an address signal which is evaluated by the network nodes 5000 and which specifies the respective subscriber terminal 5100 to which the data packet is to be sent as data signal 7 by the network node 5000. In this case, the data packet can be sent as data signal 7 from one network node 5000 to another network node 5000.

Figure 2:
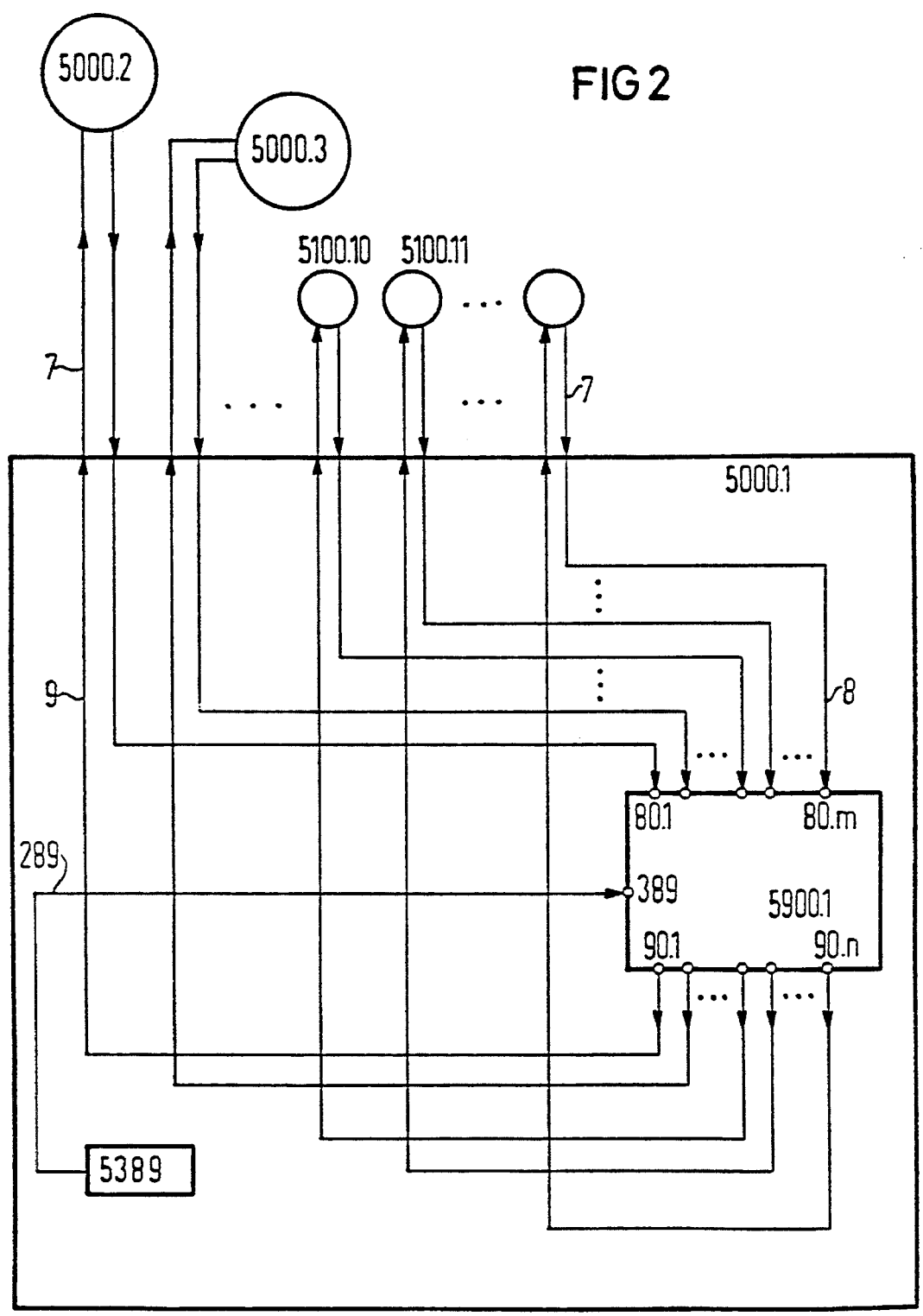
FIG. 2 shows a network node of the data network.

As FIG. 2 shows, the network node 5000.1 contains a switching center 5900. The data signals 7 received by the network node 5000.1 are fed as input signals 8 to the inputs of the switching center 5900. The output signals 9 are derived from the outputs of the switching center 5900 as the data signals 7 to be sent by the network node 5000.1. A clock signal 289 is generated by a clock generator 5389 and is fed to the switching center 5900 at the clock input 389.

Figure 3:
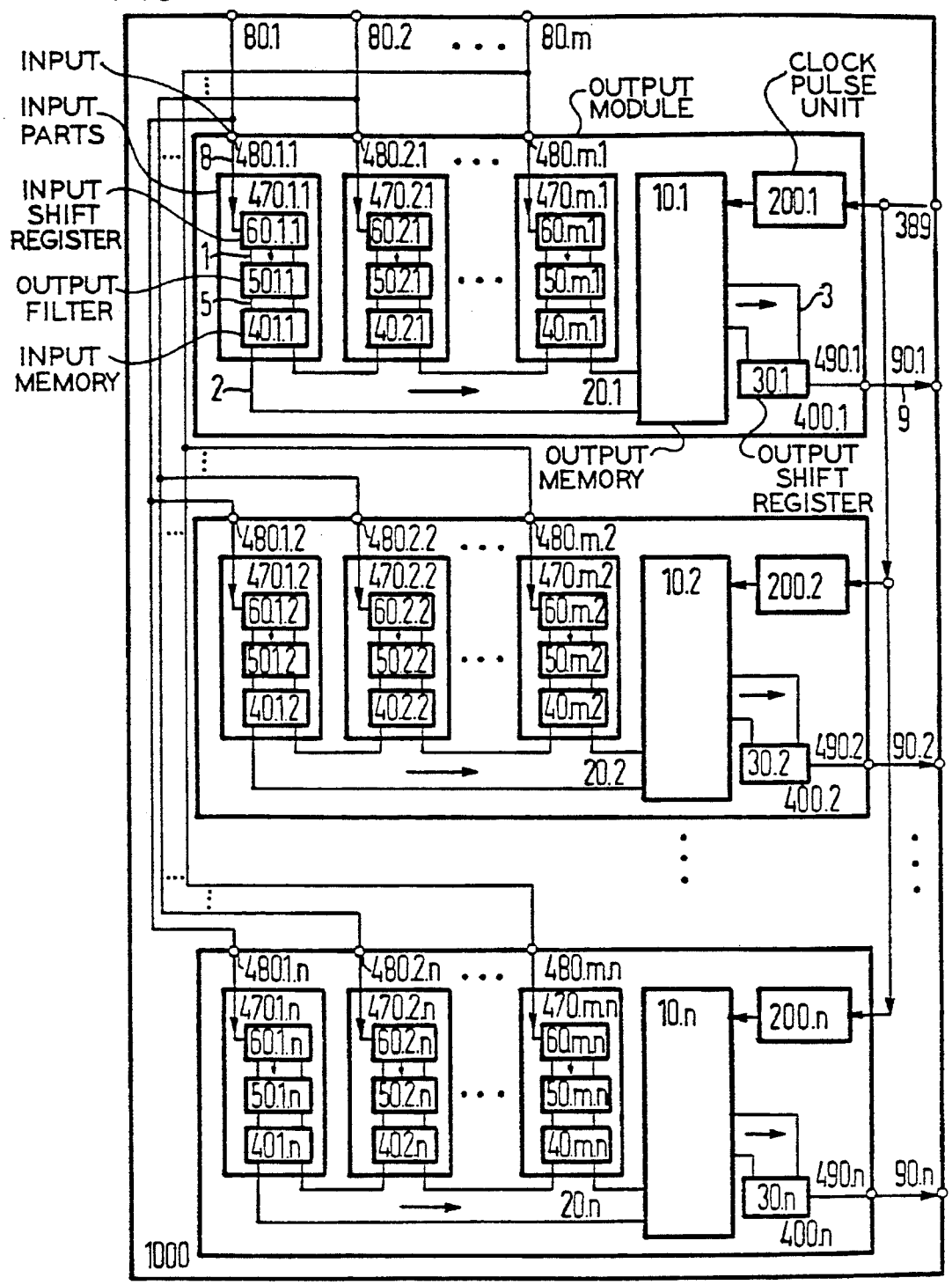
FIG. 3 shows a block circuit diagram of a first exemplary embodiment of the invention.

As FIG. 3 shows, the first exemplary embodiment of the invention is composed of a switching center 5900 in the form of a circuit arrangement 1000 which has a plurality of inputs 80 and also a plurality of outputs 90, as well as a plurality of output modules 400. The output modules 400 are of identical construction in this arrangement. Each output module 400 has a plurality of module inputs 480 and one module output 490. The first module input 480.1 is connected in each case to the first input 80.1 of the circuit arrangement 1000, the second module input 480.2 is connected to the second input 80.2, and further modules inputs 480 are connected in each case to further inputs 80 of the circuit arrangement 1000. The first module input 480.1.2 of the second output module is connected to the first input 80.1 of the circuit arrangement 1000, the second module input 480.2.2 of the second output module 400.2 is connected to the second input 80.2 of the circuit arrangement 1000. Of the further output modules 400, the first module inputs 480.1 are likewise connected in each case to the first input 80.1 of the circuit arrangement 1000, and further module inputs 480 of the output modules 400 are connected to further inputs 80 of the circuit arrangement 1000. The output 490.1 of the first output module 400.1 is connected to the first output 90.1 of the circuit arrangement 1000, the output 490.2 of the second output module 400.2 is connected to the second output 90.2 of the circuit arrangement 1000, and the outputs 490 of the further output modules 400 are connected to the further outputs 90 of the circuit arrangement 1000.

Each output module 400 has for each input 80 in each ease its own input pan 470, which is connected via the associated module input 480 in each case to the associated input 80.

Serial data packets can be input as input signals 8 at the inputs 80 of the circuit arrangement 1000. In this exemplary embodiment, these signals have a length of 256 bits, the direction information being contained at the beginning of the data packet. It is possible to ascertain from the direction information of the data packet whether the data packet is to be extracted or forwarded to one of the outputs 90 of the circuit arrangement 1000. A data packet, input for example at the input 80.1, is serially input in each case in one input pan 470.1 of one output module 400 in each case, where it is stored serially by an input shift register 60.1 in each case and converted into parallel to form successive bit groups of a bit group packet signal 1. In this exemplary embodiment, the 256-bit long data packet of the input signal 8 provided is converted into a bit group packet signal 1 composed of four bit groups of 64 bits each, the direction information being contained in the first bit group, from which it is possible to determine the relevant output for the forwarding. Beginning with a packet clock pulse of the data packet, the data packet of the input signal 8 is input serially into the input shift registers 60.1 in accordance with a bit clock pulse of the data packet, where it is forwarded in parallel in accordance with an input clock pulse that is four times as high as the packet clock pulse. With a width of 64 bits, the bit group packet signal 1 is forwarded bit group by bit group in accordance with an input clock pulse into the input parts 470.1 to the output filters 50.1 of the input parts 470.1, where the direction information is checked, and all the bit groups of the bit group packet signal 1 are either extracted or successively forwarded in accordance with the input clock pulse to an input memory 40.1 of the input parts 470.1 as the bit group packet signal 5. In accordance with the input clock pulse, which is equal to the input memory clock pulse, in each case one bit group of the bit group packet signal 5 can be temporarily stored there. The direction information specifies that the data packet input is to be forwarded to exactly one of the outputs 90 or to none of the outputs 90. From each of the output filters 50 of the output modules 400, the bit groups of the bit group packet signal 1 are forwarded as bit group packet signal 5 in each case only if the output 90 assigned to the output module 400 is ascertained from the direction information. Accordingly, an input signal 8 input at an input 80 is forwarded by exactly one or none of the output filters 50. Inner blockages are consequently prevented. In the same manner, a data packet input at an input 80.2 is converted in the input parts 470.2 to form bit groups of a bit group packet signal, in the input shift registers 60.2, checked by the output filters 50.2 with respect to the direction information, and temporarily stored in exactly one or none of the input memories 40.2 bit group by bit group in accordance with the input clock pulse.

There is provided in each output module 400 its own bit group bus 20, by means of which the bit groups of the bit group packet signal 2 temporarily stored in the input memories 40 are forwarded in accordance with a bit group bus clock pulse which is equal to the number of inputs 80 multiplied by the input clock pulse. As a result, all temporarily stored bit group packet signals can be forwarded from all input memories 40. Owing to temporary storage of the bit groups of the bit group packet signals, each input memory has here 8 bit group registers in each case, so that in each case the bit groups for a maximum of two bit group packet signals can be temporarily stored therein. In this arrangement, the temporary storage of the bit groups is carried out according to a first-in-first-out principle. Memories of this type are generally known and can be employed as input memories. In this exemplary embodiment, the bit group bus 20 has a width of 64 bits. A bit group packet signal with all bit groups is fetched in each case from one of the input memories 40 in cyclical sequence and is forwarded, provided that such a bit group packet signal has been temporarily stored therein.

Provided in each output module 400 is its own output memory 10, in which the bit groups of the bit group packet signals 2 to be forwarded are stored in bit group registers. In this exemplary embodiment, the bit group memory registers have a width of 64 bits. This corresponds to the width of parallelization and is equal to the width of the bit group and equal to the width of the bit group bus. The memory clock pulse is equal to the bit group bus clock pulse. In this exemplary embodiment, the number of bit group memory registers is equal to four times the number of inputs 80, that is to say, given four inputs 80 for example, sixteen bit group memory registers are provided. Four bit groups are stored for each bit group packet signal 2, so that in total it is possible to store a number of bit group packet signals equal to the number of inputs 80. The temporary storage of the bit groups is carried out here according to a first-in-first-out principle. Memories of this type are generally known and can be employed as output memories.

If, for example, two data packets are input simultaneously at the input 80.1 and at the input 80.2, both of which are intended for forwarding to the output 90.1, then the first bit group of the respective bit group packet signal for both in each case is temporarily stored in the input memories 40.1.1 and 40.2.1 at the input clock pulse. At the next following bit group bus clock pulse, the bit group temporarily stored in the input memory 40.1.1 does not yet form a complete bit group packet signal, so that this is ascertained by the bit group bus 20.1 and a forwarding is not yet carried out to begin with until all bit groups of a bit group packet signal are temporarily stored in the input memory. At the next input clock pulse, in each case the second bit groups of the bit group packet signals are temporarily stored in the input memories 40.1.1 and 40.2.1. At the next input clock pulse, in each case the third bit groups of the bit group packet signals are temporarily stored in the input memories 40.1.1 and 40.2.1. At the next input clock pulse, in each case the fourth bit groups of the bit group packet signals are temporarily stored in the input memories 40.1.1 and 40.2.1. After this, with the next four bit group bus clock pulses in each case, the four bit groups of the bit group packet signal are read out of the input memory 40.1.1 by means of the bit group bus 20.1 and are read in each case into the output memories 10.1 and stored. After this, with the next four bit group bus clock pulses in each case, the four bit groups of the bit group packet signal are read out of the input memory 40.2.1 by means of the bit group bus 20.1 and are read in each case into the output memories 10.1 and stored. Following this, a bit group is output from the output memory 10.1 at the output clock pulse in each case, and in this exemplary embodiment is read in parallel with a width of 64 bits into the output shift register 30.1. From the output shift register 30.1, the bit group is read out serially with the bit clock pulse and is output as output signal 9 at the output 90.1. The bit groups read into the output memories are read out into the output shift registers according to a first-in-first-out principle.

In each output module 400, in each case the bit groups are output by the output memory 10 to an output signal form converter 30 of each output module 400. In one output shift register 30 of each output signal form converter 30 in each case, the bit groups of the bit group packet signal 3 are input in parallel in each case at the output clock pulse, and the data packets of the output signal 9 are formed serially in accordance with the bit clock pulse and are output via the module outputs to the respective output 90.

Provided in each output module 400 is a clock pulse unit 200 which synchronizes and conditions for the respective output module 400 the packet clock pulse, the bit clock pulse, the input clock pulse, the output clock pulse, the bit group bus clock pulse or input memory clock pulse and the output memory clock pulse.

Figure 4:
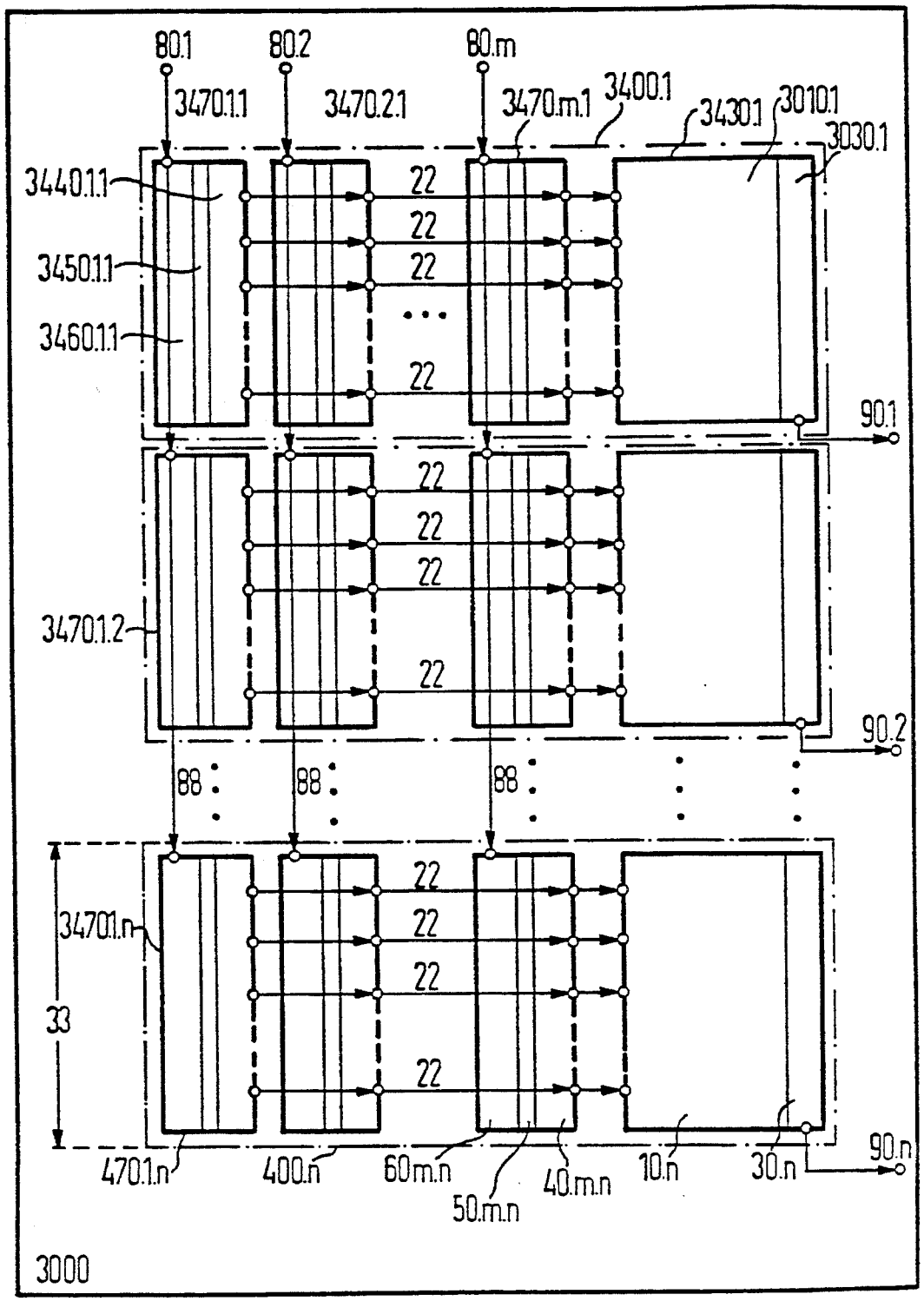
FIG. 4 shows a floor plan of the first exemplary embodiment of the invention.

As FIG. 4 shows, the circuit arrangement 1000 according to FIG. 3 is constructed in this exemplary embodiment on a single semiconductor wafer 3000. A floor plan that is described below is employed here. The output modules 400 are arranged next to one another in register-area-wide rectangular module areas 3400. Each module area 3400 contains one output area 3430 in each case, as well as one input area 3470 in each case for each input 80. The register-area-wide rectangular output area 3430 contains in each case the output shift register 30 in a register area 3030 and the output memory 10 in a memory area 3010. Each input area 3470 contains in each case in an input shift register area 3460 the input shift register 60, the output filter 50 in an output filter area 3450, and the bit group registers of the input memory 40 in a bit group register area 3440. The register area width 33 is characterized in that in this exemplary embodiment, the number of bits in the bit group is 64, and in that the flip-flop storing one bit in each case of the registers storing the bit groups, for example input shift registers, bit group registers of the input memories, bit group memory registers of the output memories, output shift registers, are arranged in at least approximately a row. These registers are arranged in each case in a rectangular area, the one rectangle side of which corresponds to the register area width 33.

These registers are arranged next to one another register area width 33 to register area width 33. This results in particularly short line connections for the forwarding of a bit from one register into the corresponding bit of the other register, and also particularly short signal transit times. This applies in particular to the bit group bus, which in this exemplary embodiment is composed of 64 line connections 22 in each case, on which the bits of the bit groups are forwarded in parallel. The connection of the inputs 80 to the module inputs is carried out via input connections 88. This floor plan results in a particularly optimum surface utilization on the semiconductor wafer.

Figure 5:
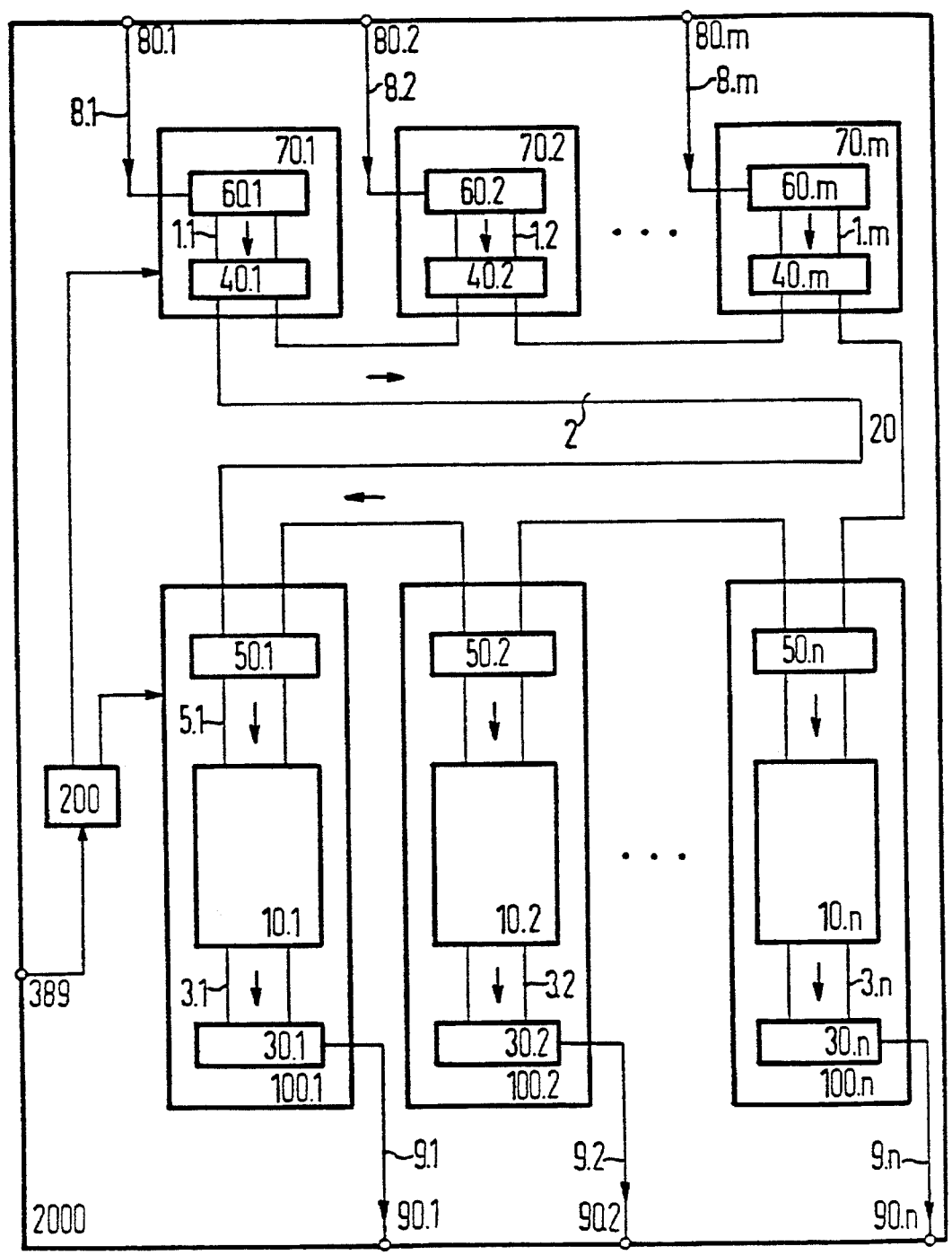
FIG. 5 shows a block circuit diagram of a second exemplary embodiment of the invention.

As FIG. 5 shows, the second exemplary embodiment of the invention is composed of a switching center 5900 in the form of a circuit arrangement 2000, which has a plurality of inputs 80 and also a plurality of outputs 90. Each of the inputs 80 is connected to exactly one input stage 70, which has an input shift register 60 and an input memory composed of exactly one bit group register 40. Provided for each of the outputs 90 is an output stage 100 which has an output filter 50, an output memory 10 and also an output shift register 30 as output signal form converter. The bit group forwarding means has a bit group bus 20 which connects the input stages 70 to the output stages 100.

Serial data packets can be input as input signals 8 at the inputs 80 of the circuit arrangement 2000, which signals have a length of 128 bits in this exemplary embodiment, the direction information being contained in the data packet. It is possible to ascertain from the direction information of the data packet whether the data packet is to be extracted or forwarded to one of the outputs 90 of the circuit arrangement 2000. A data packet 8.1, input for example at the input 80.1, is serially input into the input stage 70.1, where it is stored serially by the input shift register 60.1 and converted into parallel to form exactly one bit group of the bit group packet signal 1.1, which in this exemplary embodiment is exactly one bit group of 128 bits. Beginning with a packet clock pulse of the data packet, the data packet is input serially into the input shift register 60.1 in accordance with a bit clock pulse of the data packet, where it is forwarded in parallel into the bit group register 40.1, which is employed as input memory in this exemplary embodiment, in accordance with an input clock pulse that is equal to the packet clock pulse in this exemplary embodiment. In accordance with a bit group bus clock pulse, which in this exemplary embodiment is equal to the number of inputs 80 multiplied by the packet clock pulse, the bit group packet signals 1 temporarily stored in the bit group registers 40 are forwarded by the bit group bus 20, so that all temporarily stored bit group packet signals can be forwarded from all bit group registers 40 between two input clock pulses. In this exemplary embodiment, the bit group bus 20 and all registers provided for temporarily storing or storing the bit group of the bit group packet signal, that is to say the input shift registers 60, the bit group registers 40, the output shift registers 30 and also the bit group memory registers of the output memories 10, have a width of 128 bits. With each bit group bus clock pulse, in each case one of the bit group registers of the input memories 40 is interrogated in cyclical sequence. From the bit group bus 20, a bit group 2 is forwarded with the same bit group bus clock pulse from one of the bit group registers 40 via the output filters 50 connected directly upstream of the output memories 10 to all output memories 10 simultaneously in each case. Connected upstream of each of the outputs 90 is in each case an output signal form converter 30 and also an output memory 10 and an output filter 50, which form in each case the output stage 100 assigned to this output 90. The output filter 50 checks on the basis of the direction information of the bit group 2 forwarded by the bit group bus 20 whether the bit group 2 is to be forwarded to the assigned output 90 or extracted. As a result, only those bit groups whose forwarding to the assigned output 90 is intended are stored in the output memory 10 in each case. Thus, for example, in this exemplary embodiment a bit group temporarily stored in the bit group register 40.1 is stored in none or in exactly one of the output memories 10 as a result of its direction information.

Each of the output memories 10 is of identical construction. With each memory input, one bit group, and hence a complete bit group packet signal 5, is stored. In addition, at each memory input it is checked whether a bit group memory register is free for storing the bit group. In the case where one bit group is stored in each case in each bit group memory register of an output memory 10, the storage of the bit group to be stored is skipped for the respective output memory, with the resultant loss of this bit group. In this exemplary embodiment, the bit group memory registers have a width of 128 bits. This corresponds to the width of parallelization and is equal to the width of the bit group 2 and equal to the width of the bit group bus 20. In this exemplary embodiment, the number of bit group memory registers is equal to the number of inputs 80, that is to say, given four inputs 80 for example, four bit group memory registers are provided for each output memory in each case. The memory output is carried out at the output clock pulse.

Bit groups are read into and out of the bit group registers of the output memory 10 according to a first-in-first-out principle in this exemplary embodiment. In this exemplary embodiment the output memory operates according to a first-in-first-out principle. Memories of this type are generally known and can be employed as output memories.

The bit groups 3 are output in parallel with a width of 128 bits in each case by the output memories 10 to the output shift registers 30 of the output signal form converter.

If, for example, in each case one data packet 8 is serially input at the input 80.1 and at the input 80.2 simultaneously beginning with the data packet clock pulse, then the first data packet 8.1 in the input shift register 60.1, and the second data packet 8.2 in the input shift register 60.2 is read in serially. At the next packet clock pulse, which is equal to the input clock pulse, the first data packet 8.1 is forwarded from the input shift register 60.1 as bit group 1.1 into the bit group register 40.1 and the second data packet 8.2 is forwarded simultaneously from the input shift register 60.2 as bit group 1.2 into the bit group register 40.2, in each case in parallel with a width of 128 bits, and are temporarily stored there. As a result of the direction information, in this exemplary embodiment both temporarily stored bit groups are intended for forwarding to the output 90.1. At the next bit group bus clock pulse, the bit group 1.1 is forwarded from the bit group register 40.1 by the bit group bus 20 simultaneously to all output filters 50.

While only the output filter 50.1 releases the forwarding, all other output filters 50.2, . . . 50.n block the forwarding of the bit group 1.1 as bit group 5.1. At this bit group bus clock pulse, therefore, the bit group 5.1 is read into the output memory 10.1 and stored in a bit group memory register. At the next bit group bus clock pulse, the bit group 1.2 temporarily stored in the bit group register 40.2 is likewise forwarded by means of the bit group bus 20 to all output filters 50. The forwarding is likewise released by the output filter 50.1, while the other output filters 50.2, . . . 50.n block the forwarding. This bit group is likewise stored in the output memory 10.1. At the next packet clock pulse, which in this exemplary embodiment is equal to the input clock pulse, and is likewise equal to the output clock pulse, the first bit group 3.1 is output from the output memory 10.1.

This is input in parallel into the output shift register 30.1 of the output signal form converter and is output to the output 90.1 in the form of a serial data packet 9.1 in accordance with the bit clock pulse. At the next output clock pulse, the second bit group stored is output in parallel from the output memory 10.1 to the output shift register 30.1. This is likewise output to the output 90.1 in the form of a serial data packet in accordance with the bit clock pulse.

Figure 6:
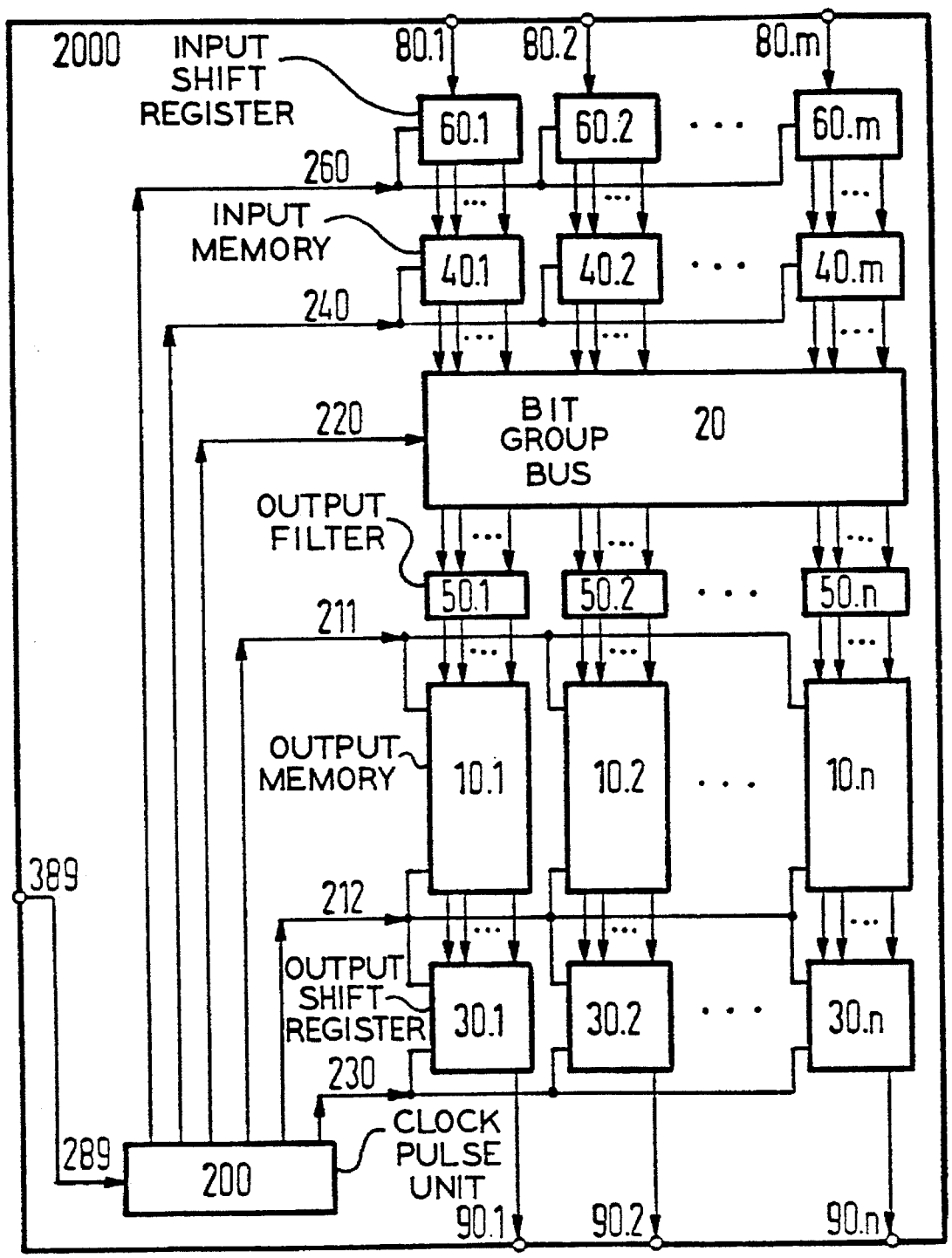
FIG. 6 shows the clock pulse supply structure for the second exemplary embodiment of the invention.

As FIG. 6 shows, in this exemplary embodiment the circuit arrangement 2000 is provided with its own clock pulse unit 200, by means of which an input clock pulse 240, an output clock pulse 212, a bit group bus clock pulse 220, an output memory clock pulse 211, and a bit clock pulse 260 for the input shift registers 60, which is equal to the bit clock pulse 230 for the output shift registers 30, are synchronized and conditioned from the clock signal 289 of the clock-synchronized data network input at the clock input 389.

Figure 7:
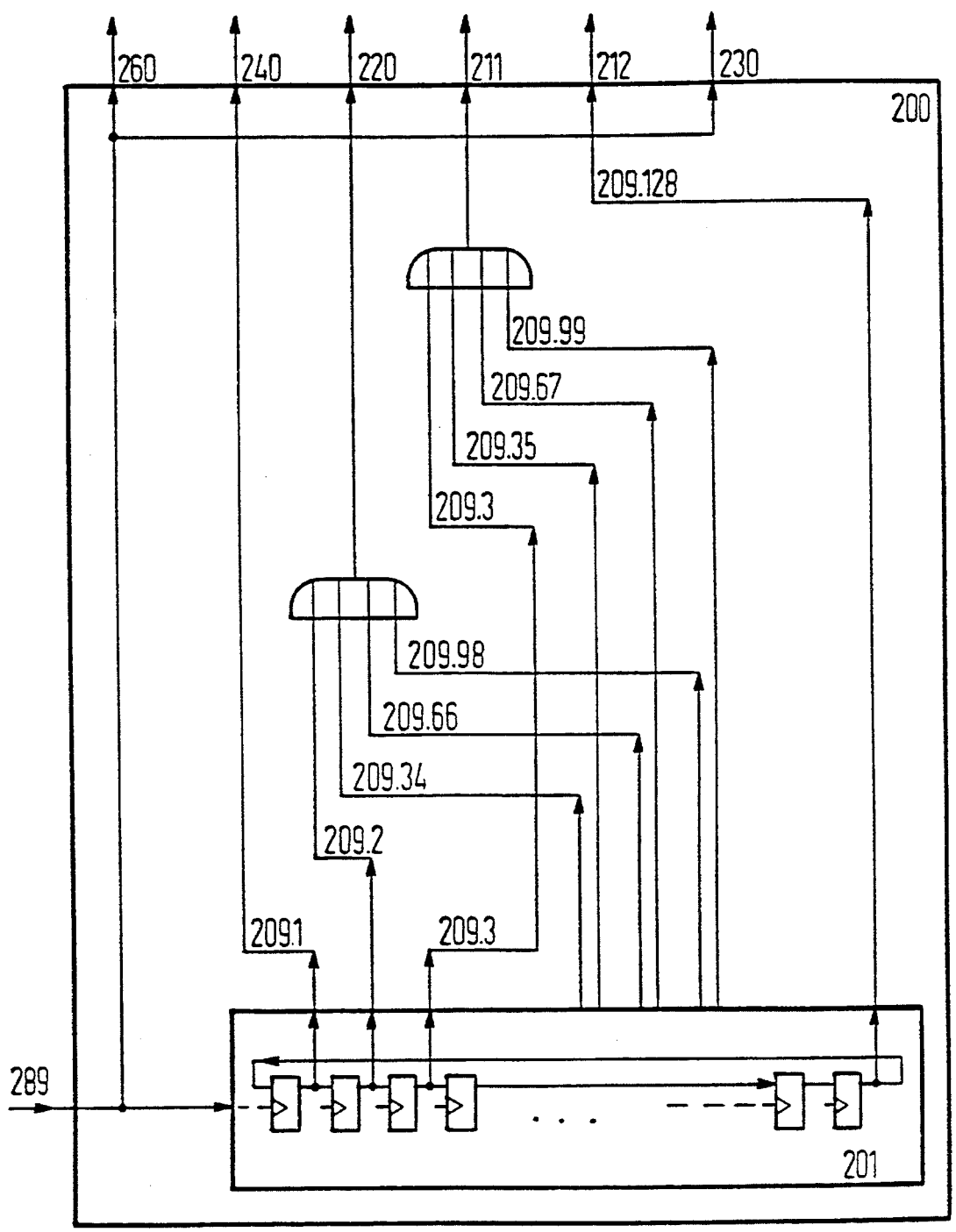
FIG. 7 shows the clock pulse unit for the second exemplary embodiment of the invention.

As FIG. 7 shows, a clock pulse shift register 201 is provided in the clock pulse unit 200, in which register the contents are erased for all cells other than one cell, and in which the contents set are shifted further cell by cell by the clock signal 289 and are input to the first cell from the last cell. The number of cells is equal here to the number of bits in the bit group packet signal. The first cell of the clock pulse shift register 201 is set with the arrival of the first bit of the input signal at the input 80. The bit clock pulses 230 and 260 are derived from the clock signal 289. The input clock pulse 240 is derived from the cell output 209.1 of the first cell. The output clock pulse 212 is derived from the cell output 209.128 of the last cell. The bit group bus clock pulse 220 is derived from the cell output 209.2 of the second cell, and it is ORed with further cell outputs evenly distributed over the clock pulse shift register 201, depending on the number of inputs 80. For example, given four inputs 80, the cell outputs 209.2, 209.34, 209.66 and 209.98 are ORed to form the bit group bus clock pulse 220. The output memory clock pulse 211 is derived from the cell output 2093 of the third cell, and it is ORed with further cell outputs evenly distributed over the clock pulse shift register 201, depending on the number of inputs 80. For example, given four inputs 80, the cell outputs 209.3, 209.35, 209.67 and 209.99 are ORed to form the output memory clock pulse 211.

Figure 8:
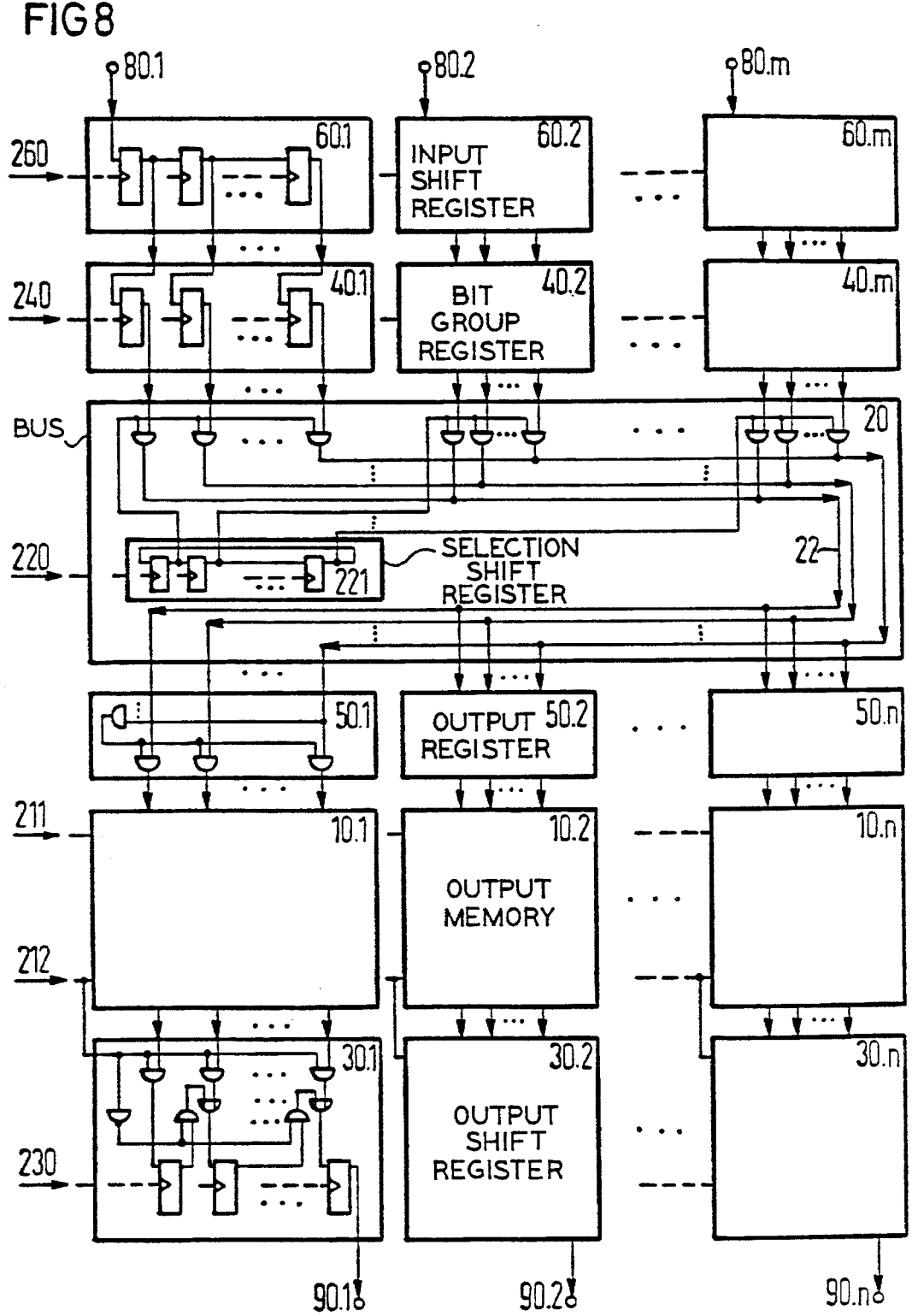
FIG. 8 shows clock-controlled switching structures for the second exemplary embodiment of the invention.

As FIG. 8 shows, the input shift registers are driven by the bit clock pulse 260. Beginning with the packet clock pulse, the first bit of the serial input signal is read in at the input 80. With the bit clock pulse 260, the input signal is read into the cells of the input shift register 60. Directly before the next packet clock pulse, all bits of the serial input signal are read into the input shift register 60 and are output at the cell outputs of the input shift register 60, the first bit of the input signal being stored in the cell represented on the right and the last bit of the input signal being stored in the cell represented on the left. With the input clock pulse 240 these contents are transferred into the bit group register 40 and temporarily stored there. The bit group bus clock pulse 220 drives a selection shift register 221. The latter has as many cells as inputs 80 are provided, the contents of all cells other than one set cell being erased. Between two input clock pulses 240, the blocking gates are opened for each of the bit group registers 40 in sequence so that the temporarily stored contents are output onto the line connections 22 of the bit group bus 20 and forwarded in each case to all output filters 50. Each output filter 50 is composed of blocking gates which can be opened by means of a logic gating, in accordance with a check of the first eight bits of the bit group packet signal, which in this exemplary embodiment contain the direction information. In this exemplary embodiment, the first bit of the bit group packet signal is set for a valid bit group packet signal. In the case where the forwarding of the bit group packet signal is blocked, in particular instead of this set bit an erased bit is forwarded by the blocking gates. The downstream output memory 10 ascertains from this bit, which is frequently referred to as the flag bit or active bit, whether a valid bit group packet signal is being forwarded and is to be stored or not. With the output memory clock pulse 211, in the case of a set flag bit the bit group packet signal is read into the output memory and stored. With the output clock pulse 212, a stored bit group packet signal is read out of the output memory 10, into the downstream output shift register 30. In this case, the output clock pulse 212 in the output shift register 30 is employed for switching over from serial forwarding to parallel input of the bit group packet signal, the respective blocking gates being switched over thereby. In accordance with the bit clock pulse 230, an input bit group packet signal is output to the output 90 by the output shift register 30.

Figure 9:
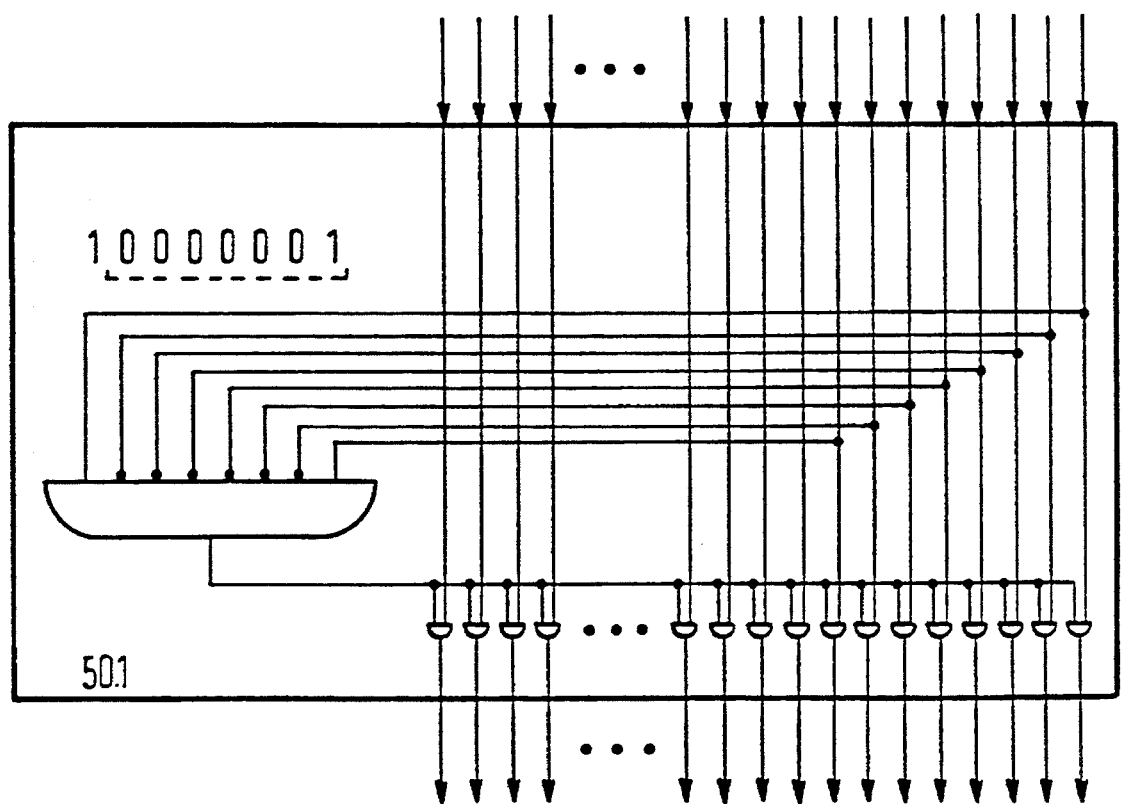
FIG. 9 shows an output filter for the second exemplary embodiment of the invention.

As FIG. 9 shows, the blocking gates of the output filter 50 are driven via a logic AND gating element for gating the first eight bit group packet signals. In this case, the first bit, which is represented on the right, is checked for a set bit. The next seven bits are checked for the direction information that corresponds to the output 90 assigned to the output filter 50. An erased bit is checked here at an inverting input of the AND gating element. Thus, in this exemplary embodiment the direction information is checked by the first output filter 50.1, which is assigned to the first output 90.1, for the binary value 10000001. This corresponds to the set flag bit and the binary number 1 for the first output 90.1 in this exemplary embodiment.

Figure 10:
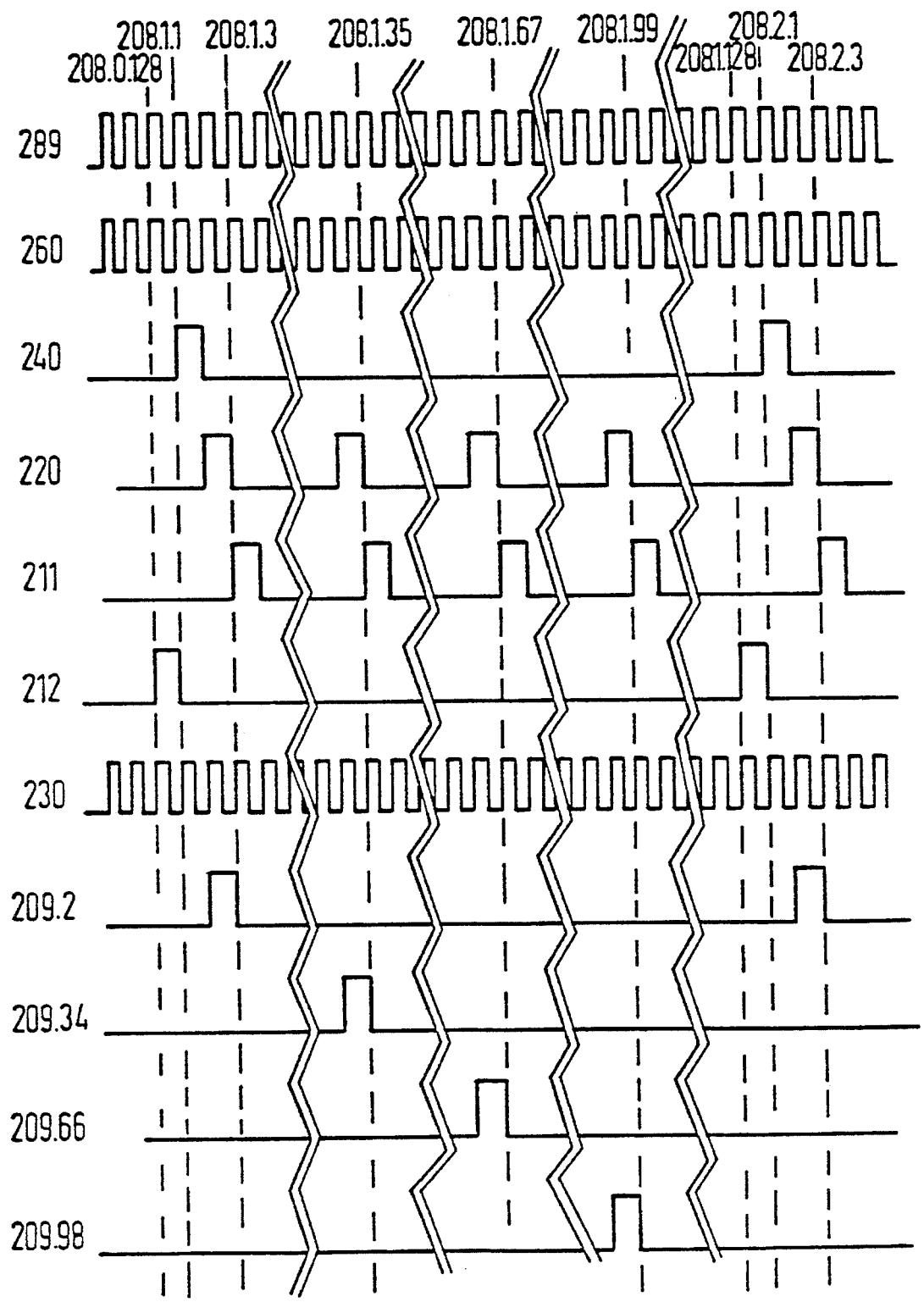
FIG. 10 shows a timing diagram for the second exemplary embodiment of the invention.

As FIG. 10 shows, up to a timing point 208.0.128 input signals serially input into the input shift registers 30 in a circuit arrangement 2000 with four inputs 80 can be read into the bit group registers 40 with the input clock pulse 240. At a timing point 208.1.3, the bit group packet signal of the first bit group register 40.1 can be forwarded via the line connections 22 of the bit group bus 20 to the output filters 50, so that it can be read into one of the output memories 10 with the output memory clock pulse 211. At a timing point 208.135, the bit group packet signal of the second bit group register 40.2 can be forwarded via the line connections 22 to the output filters 50, so that it can be read into one of the output memories 10 with the output memory clock pulse 211. At a timing point 208.1.67, the bit group packet signal of the third bit group register 40.3 can be forwarded via the line connections 22 to the output filters 50, so that it can be read into one of the output memories 10 with the output memory clock pulse 211. At a timing point 208.1.99, the bit group packet signal of the fourth and last bit group register 40.4 of this exemplary embodiment can be forwarded via the line connections 22 to the output filters 50, so that it can be read into one of the output memories 10 with the output memory clock pulse 211. As a result, all four input signals, which can be serially input between the timing points 208.0.1 and 208.0.128 at the four inputs 80, can be stored in output memories 10 up to the timing point 208.1.128. At the timing point 208.1.128, bit group packet signals can be forwarded from the output memories 10 with the output clock pulse 212 into the output shift registers 30. The output signals can be output serially from the output shift registers 30, beginning with the timing point 208.2.1.

Figure 11:
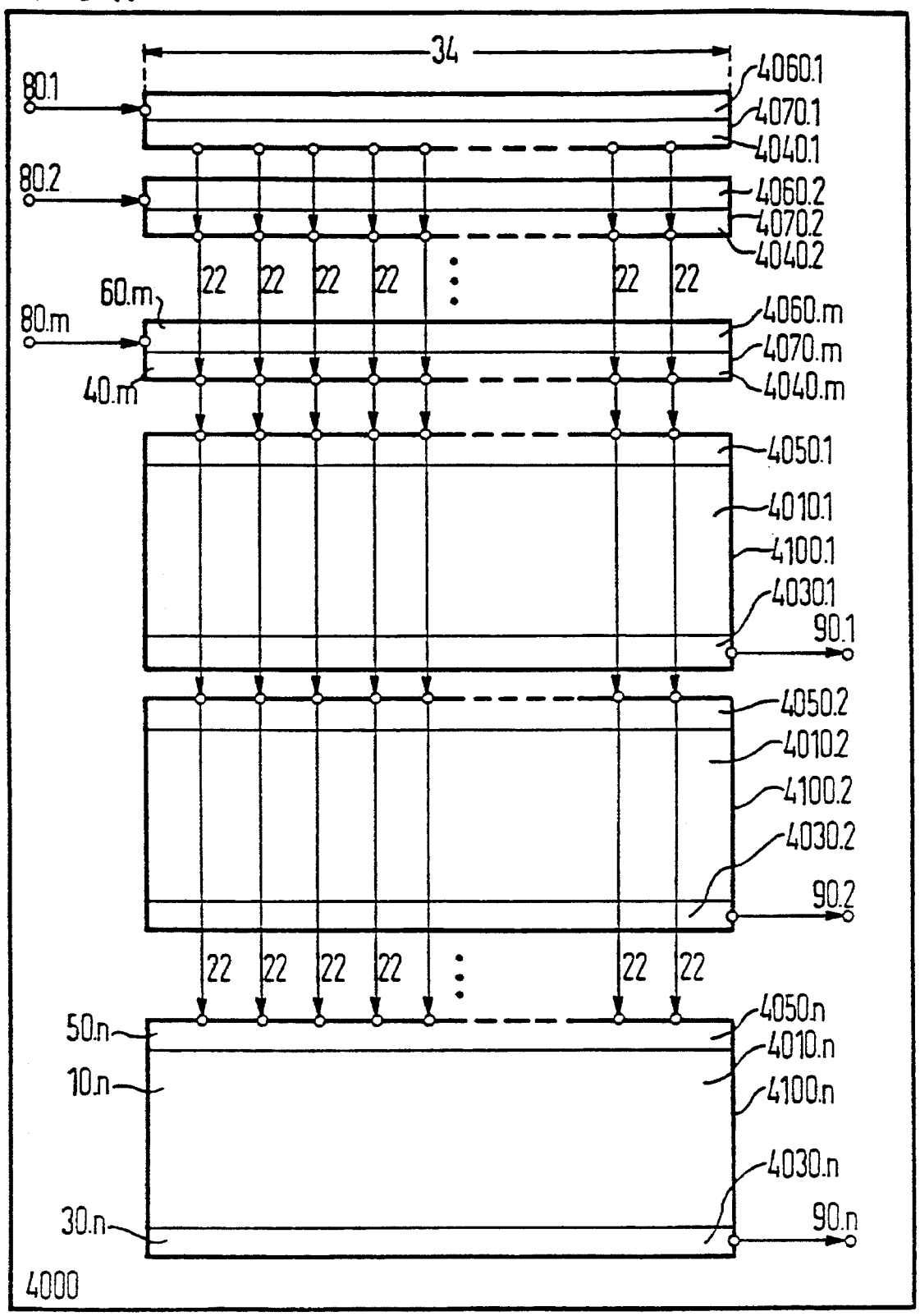
FIG. 11 shows a floor plan of the second exemplary embodiment of the invention.

As FIG. 11 shows, the circuit arrangement 2000 according to FIG. 2 is constructed in this exemplary embodiment on a single semiconductor wafer 4000. The following floor plan was employed here. Provided for each input 80 in each case is its own register-area-wide rectangular input stage area 4070. Provided in the input stage area 4070 in each case is the input shift register 60 in a register-area-wide rectangular input shift register area 4060 and in each case the bit group register 40, which is employed as input memory, in a register-area-wide rectangular bit group register area 4040. Provided for each output 90 is its own output stage area 4100 in each case. Provided in the output stage area 4100 in each case is the output filter 50 in its own output filter area 4050, in each case the output memory 10 in its own register-area-wide rectangular output memory area 4010, and in each case the output shift register 30 in its own register-area-wide rectangular output shift register area 4030. The register area width 34 is characterized in that in this exemplary embodiment, the number of bits in the bit group is 128, and in that the flip-flop storing one bit in each case of the registers storing the bit groups, for example the input shift register, the bit group register of the input memory, the bit group memory register of the output memory, the output shift register, are arranged in at least approximately a row. These registers are arranged in each case in a rectangular area, the one rectangle side of which corresponds to the register area width 34. These registers are arranged next to one another register area width 34 to register area width 34. This results in particularly short line connections 22, for the forwarding of a bit from one register into the corresponding bit of the other register, and also particularly short signal transit times. This applies in particular to the bit group bus, which in this exemplary embodiment is composed of 128 line connections 22, on which the bits of the bit groups are forwarded in parallel.

This floor plan results in a particularly optimum surface utilization on the semiconductor wafer.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

We claim:

1. A circuit arrangement with at least one input and at least one output for forwarding an input signal that can be filtered, parallelized and digitized, comprising:

the at least one input receiving the input signal, and the at least one input connected to an input signal form converter that converts the input signal into an at least partially parallelized bit group packet signal composed of at least one parallel bit group;

an output filter operatively connected to said input signal form converter for receiving said at least partially parallelized bit group packet signal and forwarding said at least partially parallelized bit group packet signal according to direction information in said at least partially parallelized bit group packet signal received by said output filter, said direction information indicative of a relevant output of said at least one output;

an intermediate memory connected to said output filter for temporarily storing the at least one parallel bit group of said at least partially parallelized bit group packet signal forwarded by said output filter;

a forwarding means connected to said intermediate memory for parallel bit group forwarding of the at least one parallel bit group of said intermediately stored bit group packet signal;

an output signal form converter connected to said forwarding means and to the at least one output, said output signal form converter converting the at least one parallel bit group received from the forwarding means into an output signal on said relevant output of the at least one output.

2. The circuit arrangement according to claim 1, wherein an input signal form of the input signal and an output signal form of the output signal are identical and are a clock-controlled serial, digital and electronic data packet.

3. The circuit arrangement according to claim 1, wherein said at least partially parallelized bit group packet signal has a plurality of parallel bit groups and wherein the output signal form converter has an output shift register, into which said plurality of parallel bit groups of the at least partially parallelized bit group packet signal are input in parallel, and from which the output signal is serially output.

4. The circuit arrangement according to claim 1, wherein said at least partially parallelized bit group packet signal has a plurality of parallel bit groups and wherein the input signal form converter has an input shift register, into which the input signal is input serially, and from which said plurality of parallel bit groups of the bit group packet signal are output in parallel.

5. The circuit arrangement according to claim 1, wherein the forwarding means has a bit group bus.

6. The circuit arrangement according to claim 1, wherein said at least partially parallelized bit group packet signal has a plurality of parallel bit groups and wherein the forwarding means has a bit group memory having bit group memory registers for storing the plurality of parallel bit groups.

7. The circuit arrangement according to claim 6, wherein the bit group memory has at least one index register for addressing the bit group memory registers.

8. The circuit arrangement according to claim 6, wherein said at least partially parallelized bit group packet signal has a plurality of parallel bit groups and wherein the bit group memory is an output memory assigned to a respective output for storing the parallel bit groups of the at least partially parallelized bit group packet signal to be forwarded to the relevant output.

9. The circuit arrangement according to claim 8, wherein the input signal has a data packet with a bit clock pulse, wherein the circuit arrangement further comprises a clock pulse unit which receives a clock signal and outputs at least a bit group clock pulse, an output memory clock pulse and a bit group bus clock pulse, and wherein a number of bits in the bit group is provided which is at least equal to the number of inputs of the circuit arrangement multiplied by the bit clock pulse of the data packet divided by the bit group clock pulse of the clock pulse unit, the bit group clock pulse being equal to the output memory clock pulse and to the bit group bus clock pulse.

10. The circuit arrangement according to claim 1, wherein the input signal is converted in the input signal form converter into a plurality of successive bit groups of the bit group packet signal and wherein the relevant output of the at least one output for the forwarding is determined from the first bit group.

11. The circuit arrangement according to claim 10, wherein the forwarding means has an output memory having a serializing means, by means of which the bit groups input into the output memory are output in successive bit group packet signals.

12. The circuit arrangement according to claim 1, wherein a bit group packet signal is composed of a single bit group.

13. The circuit arrangement according to claim 1, wherein the circuit arrangement is an integrated construction on a single semiconductor wafer.

14. The circuit arrangement according to claim 13, wherein the semiconductor wafer is made of silicon.

15. The circuit arrangement according to claim 14, wherein CMOS circuit parts are provided on the semiconductor wafer.

16. The circuit arrangement according to claim 14, wherein BICMOS circuit parts are provided on the semiconductor wafer.

17. The circuit arrangement according to claim 13, wherein the integrated construction has circuit parts arranged next to one another on the semiconductor wafer in rectangular areas with an identical register area width determined by the number of bits in the bit group.

18. The circuit arrangement according to claim 17, wherein the forwarding means has a bit group bus and wherein respective areas to be connected to the same bit group bus are arranged register area width to register area width next to one another.

* * * * *